(12) United States Patent
Chen et al.

(10) Patent No.: US 11,969,805 B2
(45) Date of Patent: Apr. 30, 2024

(54) METHOD AND DEVICE FOR MILLING LARGE-DIAMETER ASPHERIC SURFACE BY USING SPLICING METHOD AND POLISHING METHOD

(71) Applicant: SOOCHOW UNIVERSITY, Suzhou (CN)

(72) Inventors: Xi Chen, Suzhou (CN); Zhuocheng Dai, Suzhou (CN); Peiji Guo, Suzhou (CN); Yongxiang Zhu, Suzhou (CN); Chenchao Li, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 475 days.

(21) Appl. No.: 17/440,739

(22) PCT Filed: Jul. 30, 2020

(86) PCT No.: PCT/CN2020/105656
§ 371 (c)(1),
(2) Date: Sep. 17, 2021

(87) PCT Pub. No.: WO2021/179515
PCT Pub. Date: Sep. 16, 2021

(65) Prior Publication Data
US 2022/0193795 A1    Jun. 23, 2022

(30) Foreign Application Priority Data
Mar. 11, 2020   (CN) .......................... 202010164938.2

(51) Int. Cl.
B24B 13/00    (2006.01)
B23C 3/02    (2006.01)
(Continued)

(52) U.S. Cl.
CPC .............. *B23C 3/023* (2013.01); *B24B 13/00* (2013.01); *B24B 13/06* (2013.01); *B24B 51/00* (2013.01)

(58) Field of Classification Search
CPC ......... B23C 3/023; B24B 13/00; B24B 13/06; B24B 51/00
See application file for complete search history.

(56) References Cited

U.S. PATENT DOCUMENTS

2004/0250665 A1* 12/2004 Miyazawa .............. B24B 13/06
82/1.11

FOREIGN PATENT DOCUMENTS

CN   105014503 A  * 11/2015
CN   110076680 A    8/2019
(Continued)

OTHER PUBLICATIONS

Wang, Yi et al., "Computer-controlled polishing technology for small aspheric lense" Optics and Precision Engineering, vol. 15, No. 10, Oct. 31, 2007, pp. 1527-1531.

*Primary Examiner* — Michael W Choi
(74) *Attorney, Agent, or Firm* — SZDC Law PC

(57) ABSTRACT

A method and device for milling a large-diameter aspheric surface by using a splicing method and a polishing method to solve the problems of large time consumption and serious tool wear in the machining of a meter-scale large-diameter aspheric surface are disclosed. where an aspheric surface is discretized into a series of rings with different radii, and the rings are sequentially machined via generating cutting by using an annular grinding wheel tool with an outer diameter less than ¼ of a diameter of the aspheric surface; the rings are equally spaced, there are a total of N rings, and a width of any ring is jointly determined by the $N^{th}$ ring, the $(N-1)^{th}$ ring, positioning accuracy and a generatrix equation of the (Continued)

aspheric surface; and the aspheric surface is enveloped by a large number of rings. A contact area between the tool and a workpiece surface is rings.

5 Claims, 8 Drawing Sheets

(51) Int. Cl.
   *B24B 13/06* (2006.01)
   *B24B 51/00* (2006.01)

(56) References Cited

FOREIGN PATENT DOCUMENTS

| | | |
|---|---|---|
| CN | 111185817 A | 5/2020 |
| CN | 211841341 U | 11/2020 |
| JP | 2012187644 A | 10/2012 |

* cited by examiner

METHOD AND DEVICE FOR MILLING LARGE-DIAMETER ASPHERIC SURFACE BY USING SPLICING METHOD AND POLISHING METHOD

This application is the National Stage Application of PCT/CN2020/105656, filed on Jul. 30, 2020, which claims priority to Chinese Patent Application No. 202010164938.2, filed on Mar. 11, 2020, which is incorporated by reference for all purposes as if fully set forth herein.

TECHNICAL FIELD

The present invention belongs to the field of optical machining, and relates to a method for numerical control machining of a large-diameter aspheric optical element.

BACKGROUND

Aspheric optics can well correct a variety of aberrations in optical systems, improve imaging quality, and improve an identification capability of the systems. An aspheric lens is a very important optical element in optical systems, and allows multiple spherical elements to be replaced with one or several aspheric elements, so that a structure of an instrument and a system structure are simplified, a tube length is shortened, and the weight of the instrument is effectively reduced. In addition, the design of an aspheric optical system can greatly simplify a calculation method.

In recent years, technologies for machining aspheric optical components has witnessed remarkable development. The machining methods therefor mainly include: a numerical control grinding and polishing technology, a single-point diamond turning technology, ion beam machining, compression molding, etc. Different machining methods have their own advantages and disadvantages. When the numerical control grinding and polishing technology is used to machine an aspheric lens, a surface of an aspheric optical element that is closest to a spherical surface is usually first machined, then a spherical surface is ground based on this surface, and finally an aspheric surface that meets requirements is machined through grinding and polishing. However, this method consumes excessive time and leads to low production efficiency. The single-point diamond turning technology is mainly used for cutting typical parts made of non-ferrous metal materials such as duralumin, brass and oxygen-free copper. Tool offset is prone to occur during the cutting process, and an online inspection device is often required to obtain ideal aspheric precision. Although ion beam machining allows for an aspheric surface with relatively good precision, costs of a machining device and machining itself are relatively high. Besides, the machining device is not universal, which limits its popularization and application. The compression molding technology is mainly used to prepare micro and small aspheric lenses in batches, and is not suitable for large-diameter and high-precision aspheric lenses. Therefore, technologies for high-efficiency and low-cost machining of large-diameter aspheric lenses are still under continuous exploration and research.

At present, to shorten a machining cycle of an aspheric lens, when an aspheric surface is machined, roughing is first performed via generating cutting to obtain a surface closest to a spherical surface, and then a numerical control machine tool is used to directly mill and finish an aspheric surface in accordance with an aspheric surface equation based on the spherical surface. In this method, roughing via generating cutting is used to quickly remove a large amount of materials, and generally the surface closest to the spherical surface can be changed to an aspheric surface with only one time of numerical control finishing. This method features high machining efficiency and good economy, and thus has gradually been widely used. However, when the surface is changed to the aspheric surface in finishing, an excessive screw pitch of a tool path will lead to obviously insufficient removal and poor surface roughness. To improve the surface quality, the screw pitch of the tool path is usually less than 0.2 mm. For a large-diameter aspheric surface, the total length of a tool path is very large, and the machining takes a longer time. Especially when a meter-scale aspheric surface is machined with one tool, the tool has to be replaced before it can travel a complete tool path due to impact of tool wear. After the tool replacement, the new tool usually leaves machined traces on the aspheric surface. Moreover, because different tools have different parameters, source factors of surface shape errors of the machined aspheric surface inevitably become complicated, causing great difficulty to the later compensation machining and seriously affecting machining precision. Therefore, when the prior art is used to machine large-diameter aspheric lenses, especially meter-scale aspheric lenses, there are also problems of severe tool wear caused by excessively long tool paths, low machining efficiency, and difficulty in compensating for low precision of aspheric surfaces caused by machining. The conventional generating cutting requires that a diameter of an annular tool be greater than a semi-diameter of a workpiece to be machined. However, as the diameter of the tool increases, dynamic balance performance of the tool decreases sharply during machining, which seriously affects surface quality of machined glass.

SUMMARY

To solve the problems that a tool path is excessively long when a large-diameter aspheric surface is machined in the prior art, and during generating cutting, dynamic balance performance of a tool affects machining quality, the present invention provides a method for milling a large-diameter aspheric surface by using a splicing method, the aspheric surface being a concave surface, with a generatrix equation denoted as f1, the aspheric surface having a diameter of D, and a numerical control machine tool for milling having positioning accuracy of $\beta$, where the aspheric surface is discretized into N rings equally spaced in an X-axis direction, N is an integer, any ring has a width of $dx=D/(2N)$, and a semi-diameter of the aspheric surface corresponding to the $n^{th}$ ring is denoted as $x_n$; the rings are sequentially machined via generating cutting by using an annular grinding wheel tool with an outer diameter less than ¼ of the diameter of the aspheric surface; where n is the ordinal number of any one of the first ring to the $N^{th}$ ring, and constraint conditions of the dx solution are as follows: the generatrix equation of the $(N-1)^{th}$ ring is denoted as f2, and the generatrix equation of the $N^{th}$ ring is denoted as f3; a point at x1 on f3 is denoted as (x1, z1), a point with a vector height being z1 on f2 is denoted as (x2, z1), and a point at x2 on f1 is denoted as (x2, z2), where $x_n=n*dx$, $x1=D/2$, $z1-z2=\beta$, and $x2=x1-dx$.

The working principle of the above-mentioned solution is that according to the positioning accuracy of the machine tool, the aspheric surface is discretized into a series of annular rings with different radii, the rings are sequentially machined via generating cutting by using the annular grinding wheel tool with the outer diameter less than ¼ of the diameter of the aspheric surface, and the aspheric surface is enveloped by a large number of rings. The number of the rings is much less than that of conventional machining screw pitches. Because the increment dx in the x-direction of the tool path of different rings is limited by the positioning accuracy of the machine tool in this solution, the number of the rings is minimized, and a maximum residual error of the different rings does not exceed the positioning accuracy β of the machine tool. The above-mentioned machining method may be used to machine concave rotationally-symmetric curved surfaces with monotonically-increasing properties, including concave quadratic aspheric surfaces and concave high-order aspheric surfaces. Because the outer diameter of the tool is less than ¼ of the diameter of the aspheric surface, dynamic balance performance of the tool is greatly improved. When different rings are machined via generating cutting, the tool is gradually deviated from the center to the edge, and N spherical rings with different radii are spliced into the large-diameter aspheric surface, which improves the machining efficiency.

The machining method is described in detail below taking the concave quadratic aspheric surfaces as an example:

An equation of a generatrix equation f1 of the aspheric surface is: $z^2=2*R_0*x-(1+k)*x^2$, where $R_0$ is a curvature radius of a vertex of the aspheric surface, k is a quadratic conic coefficient, x is a horizontal coordinate independent variable, and z is a vertical coordinate corresponding to the x coordinate; steps for machining the aspheric surface are as follows:

(1) machining an aspheric lens body based on the curvature radius $R_0$ of the vertex, a center thickness $H_0$, and the diameter D of the aspheric surface, and machining an original spherical surface with a radius of $R_0$, a center thickness $H_1$, and a diameter of D on the aspheric lens body material, where $0 \le H1-H0 \le 0.5$;

(2) fixing the aspheric lens body in step (1) on a turntable of the numerical control machine tool, and making an optical axis of the aspheric lens body coincide with a rotation axis of the turntable of the numerical control machine tool; where the numerical control machine tool has at least two translation motion axes: an X-axis and a Z-axis, and two rotation axes: a B-axis and a C-axis, where the B-axis is a rotation axis around a Y-axis, the C-axis is a rotation axis around the Z-axis, and a rotation axis of the turntable of the numerical control machine tool is located at the C-axis; and a spindle of the numerical control machine tool is located at the Z-axis;

(3) installing an annular tool on the spindle of the numerical control machine tool, where the annular tool has an outer diameter of TD, and TD<D/4; a convex round chamfer between the outer diameter and an inner diameter of the annular tool has a radius of $r_0$; and a thickness between the outer diameter and the inner diameter of the annular tool is $2r_0$; and establishing an origin of a workpiece coordinate system at a vertex of the original spherical surface; where the annular tool is a hollow grinding wheel tool, including: an electroplated diamond grinding wheel, a bronze adhesive grinding wheel and a resin grinding wheel;

(4) solving the width dx of any ring based on the $N^{th}$ ring, the $(N-1)^{th}$ ring, the positioning accuracy, and the generatrix equation of the aspheric surface; and (5) using the annular tool on the numerical control machine tool to sequentially machine the first ring to the $N^{th}$ ring, where when the $n^{th}$ ring is machined, the C-axis rotates continuously and uniformly, and an X-axis coordinate of the tool center in the workpiece coordinate system is:

$$x_n=n*dx;$$

a curvature radius of the $n^{th}$ ring is $R_n=sqrt(R_0^2-k*x_n^2)$, and $$BB=a\ sin((TD-2*r_0)/(2*(R_n-r_0)));$$

a B-axis coordinate is: $B=a\ sin(x_n/R_n)+BB$;
the X-axis coordinate of the tool center in the workpiece coordinate system is:

$$X_T=x_n+(((TD-2*r_0)+2*r_0*sin(BB))/2)*cos(B);\ \text{and}$$

the Z-axis coordinate is:
when $k \ne -1$:

$$Z_T=(((TD-2*r_0)+2*r_0*sin(BB))/2)*sin(B)+(R_0-sqrt(R_0^2-(1+k)*x_n^2))/(1+k),\ \text{or}$$

when $k=-1$:

$$Z_T=(((TD-2*r_0)+2*r_0*sin(BB))/2)*sin(B)+x_n^2/(2*R_0);$$

where * is the multiplication operator, sqrt is the square root calculation operator, and sin, cos and a sin are the sine, cosine and arc sine operators respectively. An expression of a relationship between tool location points $X_T$ and $Z_T$ is derived based on the basic principle of machining a spherical surface via generating cutting.

A method for polishing a large-diameter aspheric surface is further provided based on the above-mentioned milling and forming method, and includes: replacing the above-mentioned annular tool with an annular polishing disk, and installing the annular polishing disk on a spindle of a numerical control machine tool; where the annular polishing disk has an outer diameter of TD, and a convex round chamfer between the outer diameter and an inner diameter of the annular polishing disk has a radius of $r_0$; and TD<D/4; establishing an origin of a workpiece coordinate system at a vertex of an original spherical surface; where the annular polishing disk includes: an annular polyurethane polishing pad, an annular flexible polishing leather and an annular airbag; using the annular polishing disk on the numerical control machine tool to sequentially machine the first ring to the $N^{th}$ ring, and spraying a polishing powder solution between the annular polishing disk and the large-diameter aspheric surface during the machining process; where the polishing powder solution is generally selected from aluminum oxide, cerium oxide, diamond micro powder and white corundum micro powder based on a hardness of a material to be polished. Because a contact track between the polishing disk and the workpiece surface is an arc, an envelope of the arc is just a spherical surface after the workpiece rotates, and each ring spherical surface forms an aspheric surface, this polishing method can be used for aspheric polishing.

The aforementioned method for milling a large-diameter aspheric lens by using a splicing method may be used to manufacture a device for numerical control milling and forming of a large-diameter aspheric lens.

The aforementioned method for polishing a large-diameter aspheric lens by using a splicing method may be used to manufacture a device for polishing a large-diameter aspheric lens by using a splicing method.

Due to the application of the above-mentioned technical solutions, the present invention has the following advantages compared with the prior art:

a. Requirements for the numerical control machine tool are greatly lowered, and aspheric machining can be implemented by using only two translation axes and two rotation axes.

b. Requirements for a stroke range of the translation axes and the rotation axes of the numerical control machine tool are greatly lowered, because the tool only needs to perform a small amount of movement along the X-axis, Z-axis and B-axis during the machining process.

c. The tool used for machining has a diameter less than ¼ of the diameter of the aspheric surface, and during the machining, dynamic balance of the tool is significantly better than that of a tool in machining performed via conventional generating cutting. In addition, a contact area between the tool and the workpiece surface is rings, while a contact area between a conventional machining tool and the workpiece surface is points. Therefore, when machining large aspheric surfaces, the annular tool has a much longer service life than that of a tool in a conventional machining method.

d. Because the aspheric surface is concave and has a monotonously increasing property, when the previous ring is milled, the next ring is removed. The machining efficiency is greatly improved compared with that of conventional machining, because dx in machining by using this method is much greater than 0.2 mm.

DESCRIPTION OF EMBODIMENTS

To explain the technical solutions of the present invention more clearly, the following further describes the technical solutions in conjunction with the accompanying drawings and embodiments.

Embodiment 1

A method for milling a large-diameter aspheric surface by using a splicing method is provided, where an equation of a generatrix equation f1 of the aspheric surface is: $z^2=2*R_0*x-(1+k)*x^2$, where $R_0$ is a curvature radius of a vertex of the aspheric surface, k is a quadratic conic coefficient, x is a horizontal coordinate independent variable, and z is a vertical coordinate corresponding to the x coordinate; a numerical control machine tool for milling has positioning accuracy of β, and steps for machining the aspheric surface are as follows.

(1) Machine an original spherical surface with a radius $R_0$, a center thickness $H_1$, and a diameter D on an aspheric lens body material based on the curvature radius $R_0$ of the vertex, a center thickness $H_0$, and the diameter D of the aspheric surface, where $0 \leq H_1 - H_0 < 0.5$.

(2) Fix the aspheric lens body in step (1) on a turntable of the numerical control machine tool, and make an optical axis of the aspheric lens body coincide with a rotation axis of the turntable of the numerical control machine tool; where the numerical control machine tool has at least two translation motion axes: an X-axis and a Z-axis, and two rotation axes: a B-axis and a C-axis, where the B-axis is a rotation axis around a Y-axis, the C-axis is a rotation axis around the Z-axis, and a rotation axis of the turntable of the numerical control machine tool is located at the C-axis; and a spindle of the numerical control machine tool is located at the Z-axis.

Figure 2:
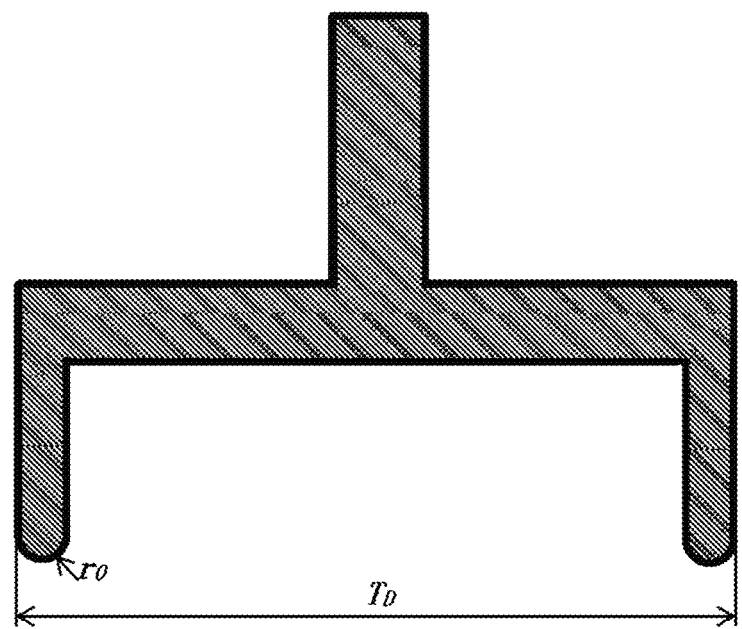
FIG. 2 is a schematic diagram illustrating a radial section of an annular tool.

(3) Install an annular tool on the spindle of the numerical control machine tool, as shown in FIG. 2, where the annular tool has an outer diameter of TD; a convex round chamfer between the outer diameter and an inner diameter of the annular tool has a radius of $r_0$; a thickness between the outer diameter and the inner diameter of the annular tool is $2r_0$; and TD<D/4; and establish an origin of a workpiece coordinate system at the vertex of the original spherical surface; where the annular tool is a hollow grinding wheel tool, including: an electroplated diamond grinding wheel, a bronze adhesive grinding wheel and a resin grinding wheel.

Figure 3:
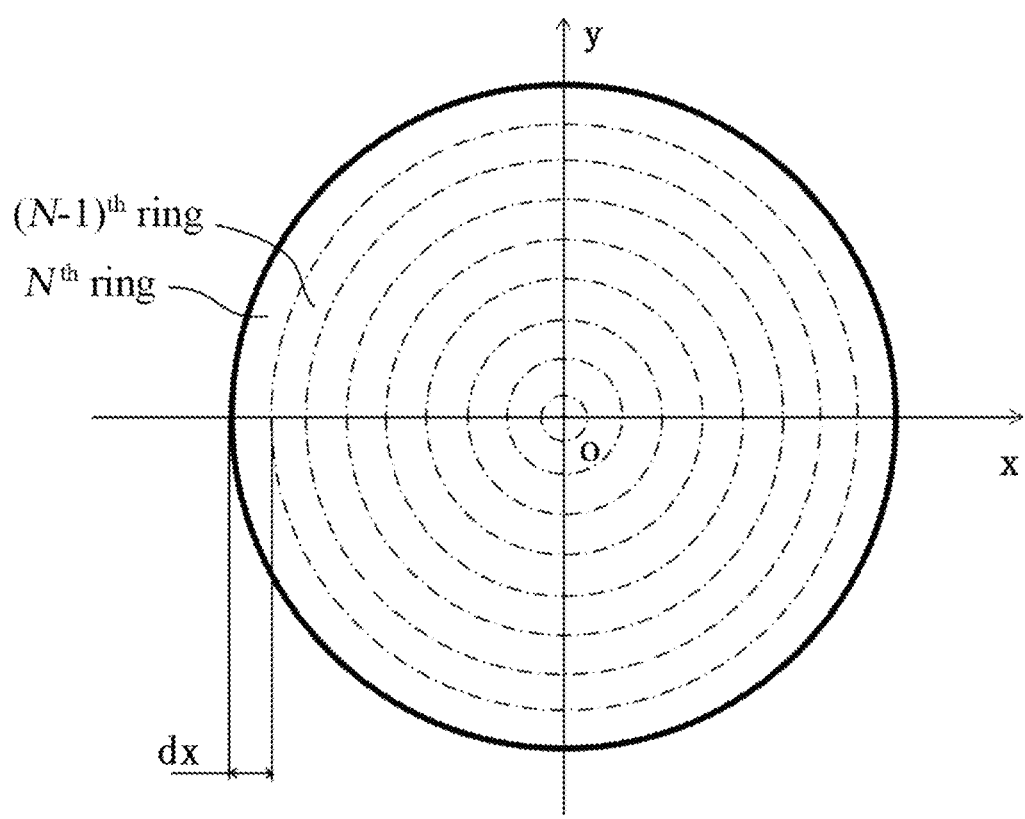
FIG. 3 is a schematic diagram illustrating discrete and equally spaced rings of an aspheric surface.

(4) As shown in FIG. 3, discretize the aspheric surface into N rings equally spaced in an X-axis direction, N is an integer, any ring has a width of dx=D/(2N), and a corresponding aspheric semi-diameter of the $n^{th}$ ring is denoted as: $x_n$: $x_n = n*dx$; and the $n^{th}$ ring has a curvature radius of $R_n = sqrt(R_0^2 - k*x_n^2)$; where n is the ordinal number of any one of the first ring to the $N^{th}$ ring.

dx is jointly determined by the $N^{th}$ ring, the $(N-1)^{th}$ ring, the positioning accuracy β, and the generatrix equation f1 of the aspheric surface.

Constraint conditions of the dx solution are as follows: the generatrix equation of the $(N-1)^{th}$ ring is denoted as f2, and the generatrix equation of the $N^{th}$ ring is denoted as f3; a point at x1 on f3 is denoted as (x1, z1), a point with a vector height being z1 on f2 is denoted as (x2, z1), and a point at x2 on f1 is denoted as (x2, z2), where x1=D/2, z1−z2=β, and x2=x1−dx; and dx is calculated from the above-mentioned geometric relationship.

Figure 4:
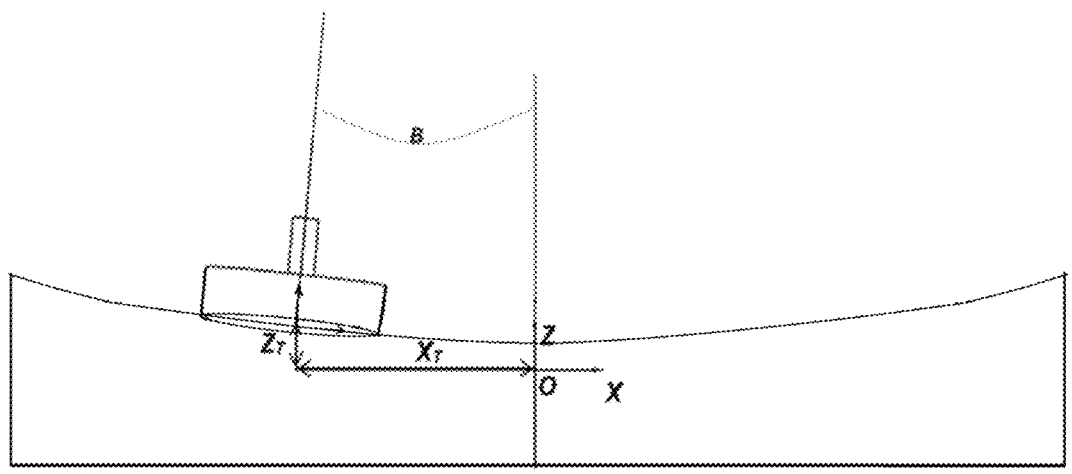
FIG. 4 is a schematic diagram illustrating positions of tool location points of an annular tool.
Figure 5:
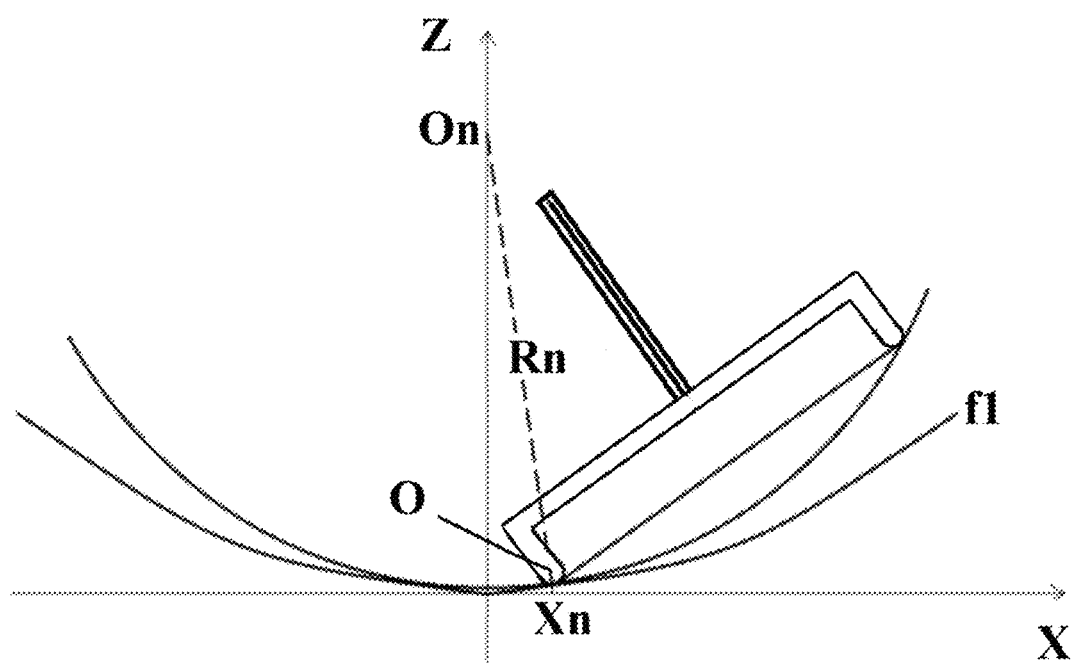
FIG. 5 is a schematic diagram illustrating conversion from a tool contact point to a tool location point.

(5) Use the annular tool on the numerical control machine tool to sequentially machine the first ring to the $N^{th}$ ring, where when the $n^{th}$ ring is machined, the C-axis rotates continuously and uniformly, and based on the positional relationship between the annular tool and the aspheric workpiece shown in FIG. 4 and FIG. 5, an X-axis coordinate and a Z-axis coordinate of the tool center in the workpiece coordinate system are respectively deduced as follows:

$x_n = n*dx;$ $BB = a\sin((TD - 2*r_0)/(2*(R_n - r_0)));$ a B-axis coordinate is: $B = a\sin(x_n/R_n) + BB;$ the X-axis coordinate of the tool center in the workpiece coordinate system is:

$X_T = x_n + (((TD - 2*r_0) + 2*r_0*\sin(BB))/2)*\cos(B);$ and the Z-axis coordinate is:
when $k \neq -1$:

$$Z_T=(((TD-2*r_0)+2*r_0*\sin(BB))/2)*\sin(B)+(R_0-\mathrm{sqrt}(R_0^2-(1+k)*x_n^2))/(1+k), \text{ or}$$

when $k=-1$:

$$Z_T=(((TD-2*r_0)+2*r_0*\sin(BB))/2)*\sin(B)+x_n^2/(2*R_0);$$

where * is the multiplication operator, sqrt is the square root calculation operator, and sin, cos and a sin are the sine, cosine and arc sine operators respectively.

The convex round chamfer area of the annular grinding wheel tool is usually attached with abrasives such as emery, and is used as a cutting edge during machining to grind a glass material that comes into contact therewith. Tool location points of the tool center are located at B, $X_T$ and $Z_T$. During the machining process, the cutting edge of the annular grinding wheel tool is always located on the rotation center axis of the workpiece. When machining is performed from the first ring to the $N^{th}$ ring, the whole machining process is as follows: the grinding wheel moves up and down along the rotation center axis and swings by a corresponding angle B in different positions.

Figure 6:
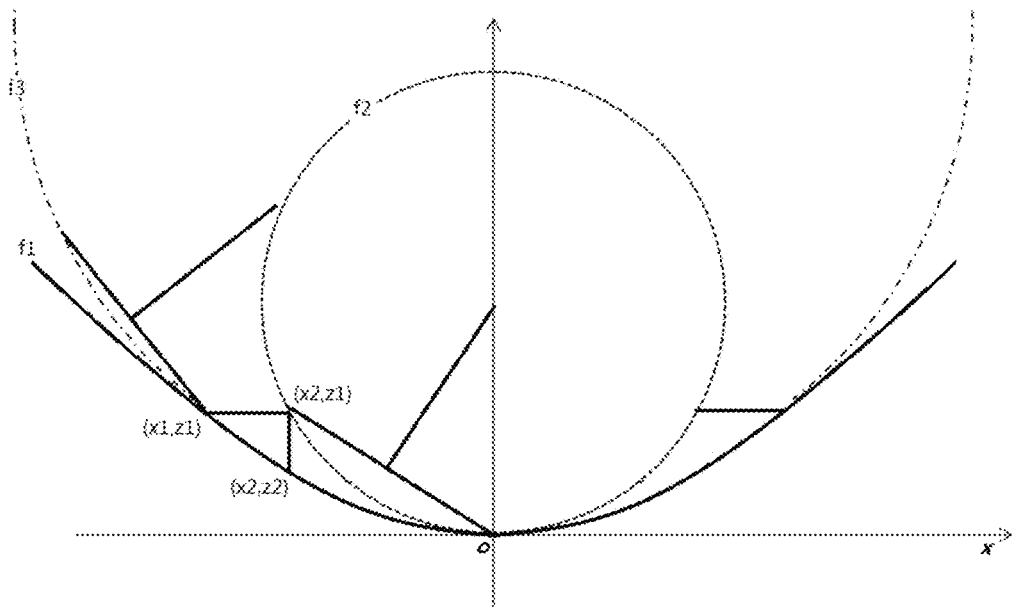
FIG. 6 is a schematic diagram of solving a ring width dx.

The specific dx solution is as follows: As shown in FIG. 6, quadratic aspheric surface equations are:

$$f1: x^2 = 2R_0 z - (1+k)z^2$$
$$f2: (z-(R_0-kz_3))^2 + x^2 = R_0^2 - kx_3^2$$
$$f3: (z-(R_0-kz_1))^2 + x^2 = R_0^2 - kx_1^2$$
$$dx = x_1 - x_3$$
$$x_1 = \frac{D}{2}$$

$z_1$ is substituted into f3 to obtain x2

$$x_2 = \sqrt{R_0^2 - kx_3^2 - (z_1-(R_0-kz_3))^2}$$

x2 is substituted into f1 to obtain $z_2$ $$r_2 = \frac{R_0 - \sqrt{R_0^2-(1+k)x_2^2}}{1+k}$$
$$\beta = z_1 - r_2$$
$$\beta = z_1 - \frac{R_0 - \sqrt{R_0^2-(1+k)(R_0^2-kx_3^2-(z_1-(R_0-kz_3))^2)}}{1+k}$$
$$z_3 = \frac{R_0 - \sqrt{R_0^2-(1+k)x_3^2}}{1+k}$$

From this, an expression of a relationship between dx and β is obtained. When $R_0$, k, a semi-diameter $x_1$ and β are known, dx that meets the conditions can be solved.

Figure 7:
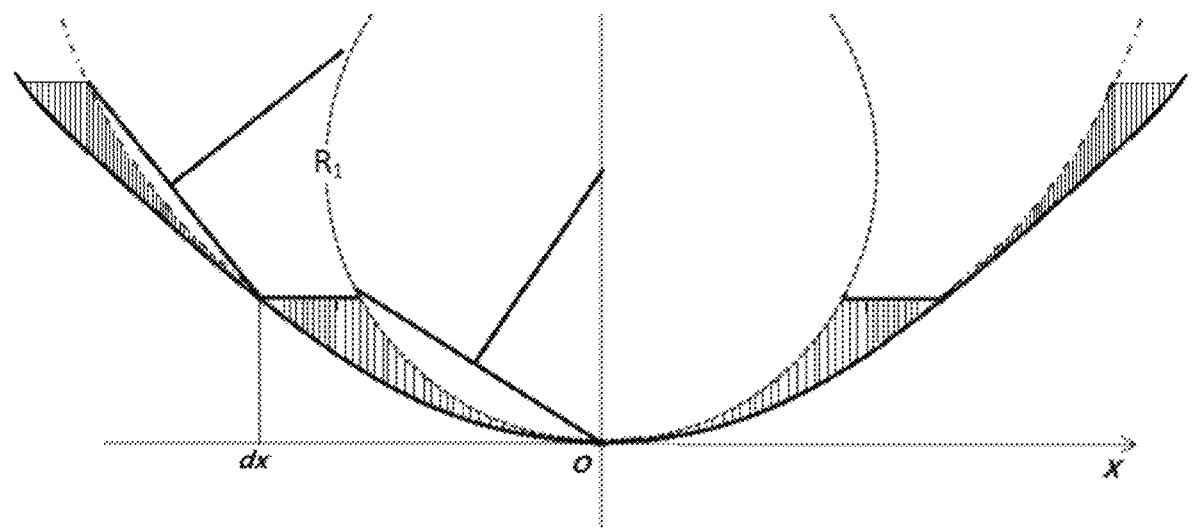
FIG. 7 is a schematic diagram illustrating an aspheric surface enveloped by a series of spherical rings.

In the above-mentioned solution, the aspheric surface is discretized into a series of annular rings with different radii, as shown in FIG. 7, the rings $R_1$, $R_2$, $R_3$ . . . are sequentially machined via generating cutting by using the annular grinding wheel tool, and the aspheric surface is enveloped by a large number of spherical rings. The number of the rings is much less than that of conventional machining screw pitches, and because in this solution, the increment dx in the x-direction of the tool path of different rings is limited by the positioning accuracy of the machine tool, i.e., the number of the rings is minimized, the shaded part in the figure shows a schematic residual between different rings and an actual aspheric surface, the maximum residual error of the different rings can be controlled within the accuracy of the machine tool provided that the ring width is reasonably controlled.

Embodiment 2

Taking a specific aspheric surface as an example, the method in Embodiment 1 is further described. $k=-0.8$, $R_0=2500$, $D=1000$, machine tool positioning accuracy $\beta=0.001$. The annular tool is an electroplated diamond grinding wheel, with an outer diameter of TD=50, and the convex round chamfer between the outer diameter and the inner diameter of the annular tool has a radius of $r_0=1$.

A method for milling of a large-diameter aspheric lens by using a splicing method is provided, where an original spherical surface with a radius of 2500, a center thickness $H_1=200.2$ and a diameter of 1000 needs to be machined on an aspheric lens body material based on a curvature radius $R_0=2500$ of the vertex, a center thickness $H_0=200$ and a diameter D=1000 of the aspheric surface; and only an original spherical surface with a diameter of 100 at most can be milled directly via generating cutting and a tool with an outer diameter of TD=50.

Figure 1:
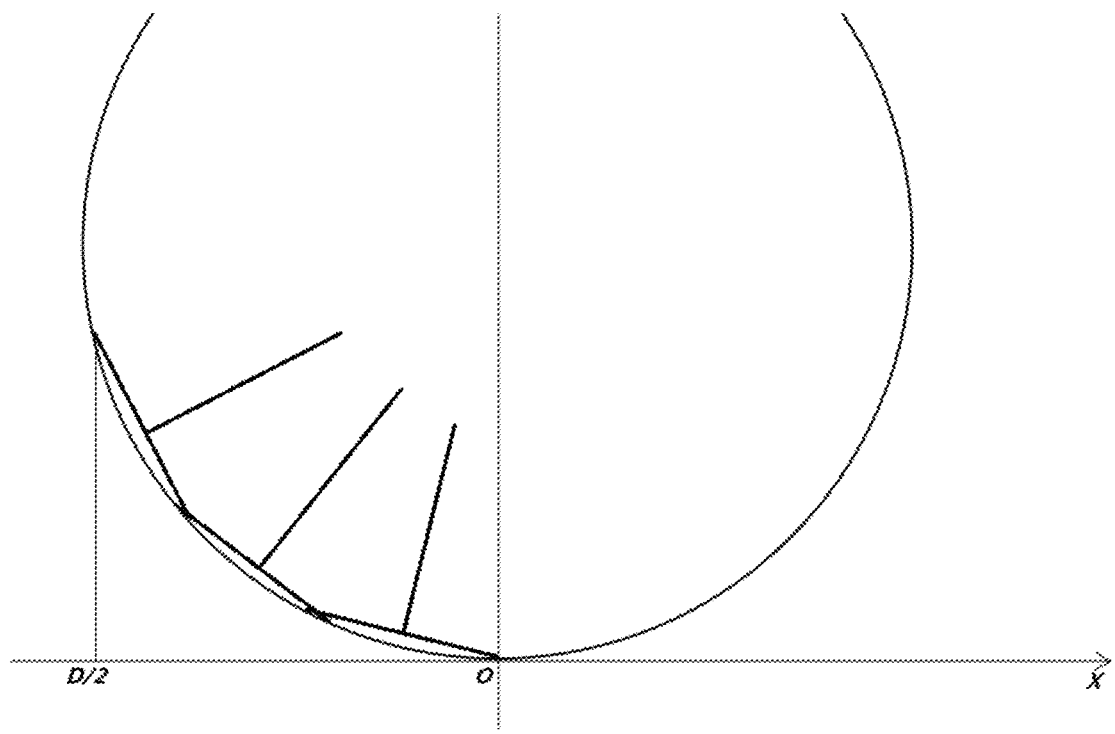
FIG. 1 is a schematic diagram illustrating a principle of grinding machining of an original spherical surface.

Because the selected annular tool has a diameter of TD=50, which is less than the semi-diameter D/2 of the aspheric surface, the milling of the original spherical surface requires multiple adjustments of the tool offset position and a tool axis angle so as to achieve a target diameter through splicing. As shown in FIG. 1, the semi-diameter obtained by milling via generating cutting for the first time is about $2*TD*\cos B_1$, and $B_1=a\sin((TD-2*r)/(2*(R_0-r)))$; a ball with a semi-diameter of $2*TD*\cos B_1$ is milled at the center first, then the tool position and the tool axis angle are changed, and outer spherical rings are sequentially milled. To ensure that there is no residual at spliced positions at different rings, different rings may coincide by several millimeters, for example, overlap by 1 mm, then a horizontal coordinate of the second start point is denoted as $m_1$, coordinates on the corresponding circle are (m1, n1), $m_1=2*TD*\cos B_1-1$, and the second milling tool axis angle is:

$$B_2 = a\sin(m_1/R_0)+B_1,$$

coordinates of the tool location point are:

$$X_{T0}=m_1+(((TD-2*r_0)+2*r_0*(TD-2*r_0)/2*(R_0-r_0))/2)*\cos B_2, \text{ and}$$

$$Z_{T0}=n_1+(((TD-2*r_0)+2*r_0*(TD-2*r_0)/2*(R_0-r_0))/2)*\sin B_2,$$

where $X_{T0}$ and $Z_{T0}$ represent the X-axis coordinate and Z-axis coordinate of the tool center respectively; and the semi-diameter that can be reached is about $2*TD*\cos B2+2*TD*\cos B1-1$, and the target diameter can be obtained by milling accordingly.

$B_{T0}$ represents the tool axis angle of any ring, and calculated $B_{T0}$, $X_{T0}$ and $Z_{T0}$ of the original spherical surface milled several times are shown in Table 1.

TABLE 1

$B_{T0}$, $X_{T0}$ and $Z_{T0}$ corresponding to the milled original spherical surface

| Ordinal number | $X_{T0}$ | $Z_{T0}$ | $B_{T0}$ (unit: degree) |
|---|---|---|---|
| 1 | 73.0061906703595 | 0.710785354709420 | 0.550268046264464 |
| 2 | 121.975739072467 | 2.62169622334711 | 1.67328438149519 |
| 3 | 170.897853394143 | 5.49195850406179 | 2.79629631516061 |
| 4 | 219.753356819546 | 9.32040172387420 | 3.91929502099838 |
| 5 | 268.523099768873 | 14.1054569759345 | 5.04227163738218 |
| 6 | 317.187967862608 | 19.8451573718191 | 6.16521725038433 |
| 7 | 365.728889875652 | 26.5371386054845 | 7.28812287658646 |
| 8 | 414.126845679048 | 34.1786396272150 | 8.41097944555773 |
| 9 | 462.362874167471 | 42.7665034255562 | 9.53377778191662 |
| 10 | 510.418081169299 | 52.2971779148012 | 10.6565085868892 |
| 11 | 558.273647338921 | 62.7667169252069 | 11.7791624192721 |

It can be learned from Table 1 that an annular tool with a diameter of 50 needs to be moved 11 times to grind the original spherical surface with a diameter of 1000.

dx is solved based on the $N^{th}$ ring, the $(N-1)^{th}$ ring, the positioning accuracy $\beta$, and the generatrix equation of the aspheric surface.

For dx=12.3 calculated from the above-mentioned relationship, N=41 is obtained after rounding, and dx=12.1951 is recalculated; and $R_n$, B, $X_T$ and $Z_T$ calculated under different ring ordinal numbers using the solution in Embodiment 1 are shown in Table 2.

TABLE 2

Ring curvature radii, B, $X_T$ and $Z_T$ corresponding to different ring ordinal numbers

| Ring ordinal number n | $R_n$ | B (unit: degree) | $X_T$ | $Z_T$ |
|---|---|---|---|---|
| 1 | 2500 | 0.550268046 | 24.00849657 | 0.230584431 |
| 2 | 2500.023795 | 0.829752359 | 36.20218608 | 0.377436911 |
| 3 | 2500.095179 | 1.109216883 | 48.39530434 | 0.583761503 |
| 4 | 2500.214148 | 1.388652313 | 60.58785162 | 0.849552798 |
| 5 | 2500.380695 | 1.66804935 | 72.77982826 | 1.17480624 |
| 6 | 2500.594811 | 1.947398702 | 84.97123471 | 1.559518132 |
| 7 | 2500.856483 | 2.22669109 | 97.1620715 | 2.003685636 |
| 8 | 2501.165697 | 2.505917246 | 109.3523393 | 2.507306776 |
| 9 | 2501.522434 | 2.785067916 | 121.5420387 | 3.07038044 |
| 10 | 2501.926675 | 3.064133866 | 133.7311706 | 3.692906383 |
| 11 | 2502.378396 | 3.343105878 | 145.9197358 | 4.374885227 |
| 12 | 2502.877572 | 3.621974757 | 158.1077354 | 5.116318468 |
| 13 | 2503.424174 | 3.90073133 | 170.2951703 | 5.917208471 |
| 14 | 2504.018172 | 4.179366452 | 182.4820418 | 6.777558482 |
| 15 | 2504.659532 | 4.457871003 | 194.6683511 | 7.697372622 |
| 16 | 2505.348216 | 4.736235894 | 206.8540994 | 8.676655894 |
| 17 | 2506.084187 | 5.014452067 | 219.0392882 | 9.715414183 |
| 18 | 2506.867402 | 5.292510498 | 231.223919 | 10.81365426 |
| 19 | 2507.697818 | 5.5704022 | 243.4079934 | 11.9713838 |
| 20 | 2508.575387 | 5.848118222 | 255.5915129 | 13.18861134 |
| 21 | 2509.500059 | 6.125649653 | 267.7744794 | 14.46534633 |
| 22 | 2510.471784 | 6.402987626 | 279.9568946 | 15.80159912 |
| 23 | 2511.490506 | 6.680123314 | 292.1387605 | 17.19738095 |
| 24 | 2512.556169 | 6.957047938 | 304.3200791 | 18.65270398 |
| 25 | 2513.668711 | 7.233752767 | 316.5008523 | 20.16758125 |
| 26 | 2514.828072 | 7.510229118 | 328.6810823 | 21.74202673 |
| 27 | 2516.034186 | 7.786468359 | 340.8607714 | 23.37605529 |
| 28 | 2517.286987 | 8.062461912 | 353.0399218 | 25.06968272 |
| 29 | 2518.586404 | 8.338201254 | 365.2185359 | 26.82292573 |
| 30 | 2519.932366 | 8.613677917 | 377.3966161 | 28.63580195 |
| 31 | 2521.324797 | 8.888883493 | 389.574165 | 30.50832992 |
| 32 | 2522.763622 | 9.163809632 | 401.751185 | 32.44052914 |
| 33 | 2524.24876 | 9.438448048 | 413.927679 | 34.43242001 |
| 34 | 2525.780131 | 9.712790517 | 426.1036495 | 36.48402387 |
| 35 | 2527.357649 | 9.986828879 | 438.2790994 | 38.59536301 |
| 36 | 2528.981229 | 10.26055504 | 450.4540315 | 40.76646064 |
| 37 | 2530.650781 | 10.53396098 | 462.6284488 | 42.99734094 |
| 38 | 2532.366216 | 10.80703874 | 474.8023543 | 45.28802901 |
| 39 | 2534.12744 | 11.07978044 | 486.9757509 | 47.63855092 |
| 40 | 2535.934357 | 11.35217826 | 499.1486418 | 50.04893368 |
| 41 | 2537.786869 | 11.62422446 | 511.3210303 | 52.51920528 |

Figure 8:
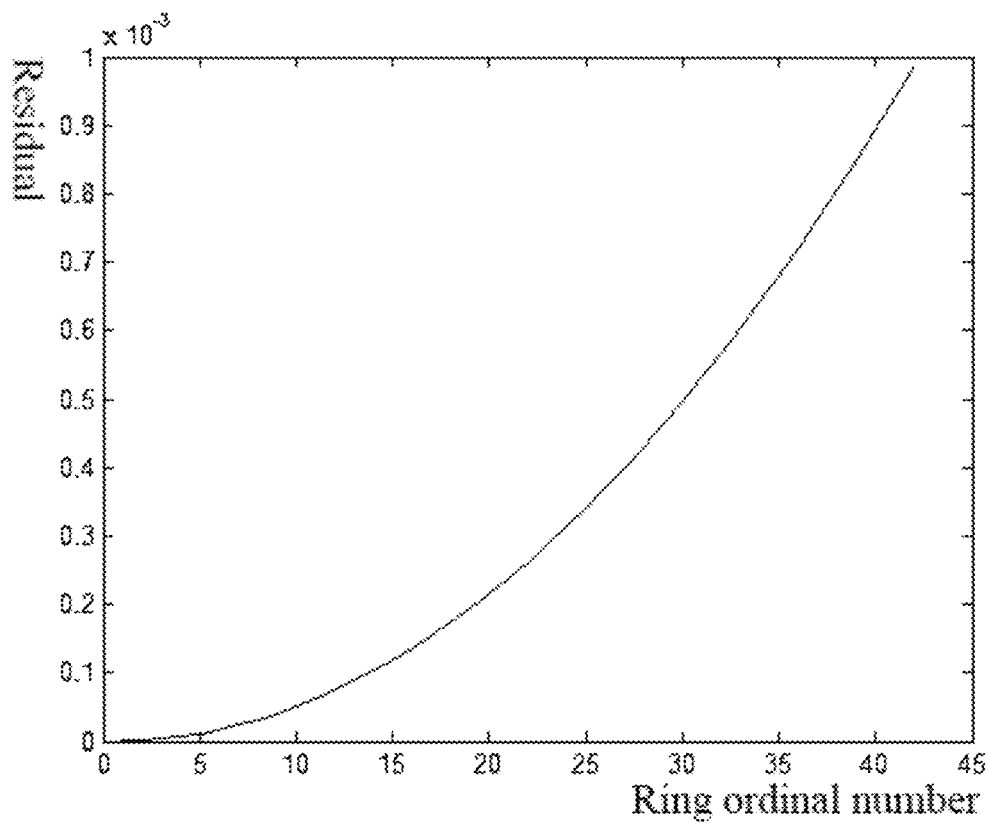
FIG. 8 is a schematic diagram illustrating an instance of a ring ordinal number residual relationship.
Figure 9:
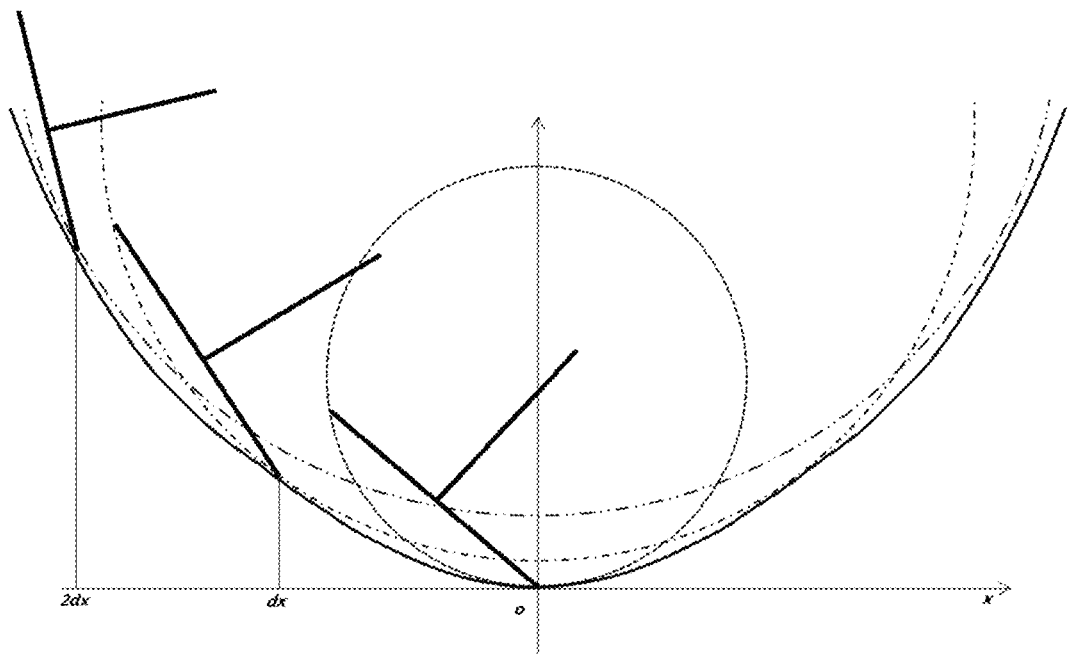
FIG. 9 is a schematic diagram illustrating a principle of arc envelope grinding of a rotary aspheric surface.

From a residual error curve from the first ring to the $N^{th}$ ring shown in FIG. 8, it can be learned that the residual shows a monotonically increasing trend as N increases, and the maximum residual does not exceed the positioning accuracy of the machine tool axis. When any ring in Table 2 is machined, the ring can be machined only by moving tool location points to $X_T$ and $Z_T$, making an included angle between the tool axis and the rotation axis of the turntable of the numerical control machine tool be B, and rotating the C-axis by more than 360°. According to the calculation, the target aspheric surface can be obtained by completing the milling of 41 rings. A distance between rings is directly proportional to the maximum residual. This method connects the maximum residual with the positioning accuracy of the machine tool to obtain the maximum distance between rings not exceeding the positioning accuracy of the machine tool, which not only meets the machining accuracy, but also improves the machining efficiency. Compared with a conventional point milling method with discrete points at intervals of 0.2 mm, this method can be used to splice and envelope an aspheric surface by using 41 spherical rings with different curvature radii. The accuracy of the surface machined in this method depends entirely on the accuracy of the tool parameters. During compensation machining, compensation can be implemented only by adjusting the two tool parameters. Any point on an aspheric generatrix has a corresponding curvature radius similar to that of a nearby point. A relatively large interval can be taken within an allowable error range of surface accuracy to improve machining efficiency.

Figure 10:
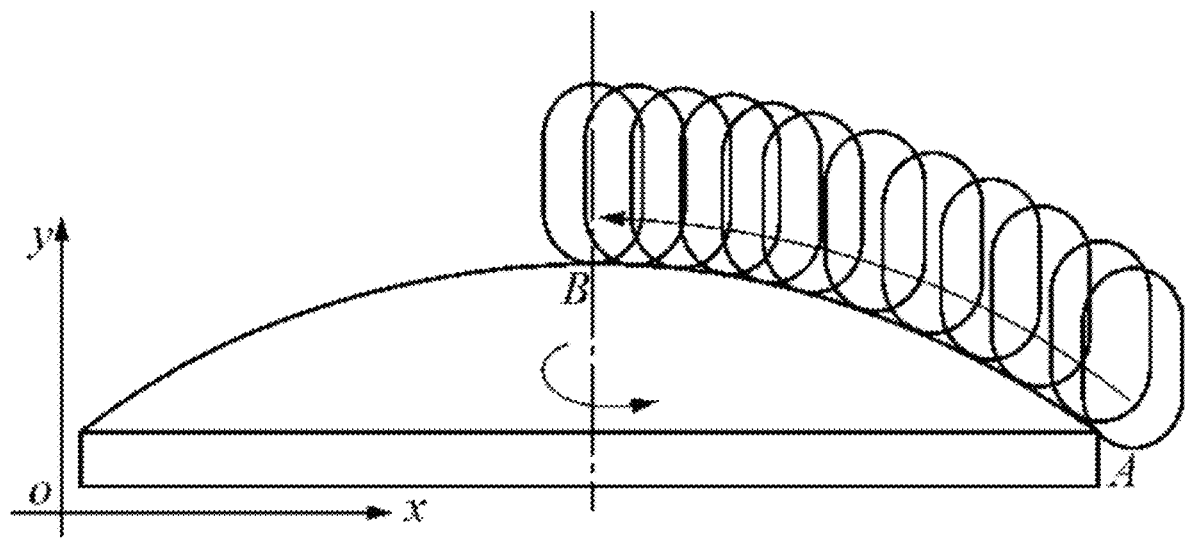
FIG. 10 is a front view illustrating a principle of arc envelope grinding of a rotary aspheric surface.
Figure 11:
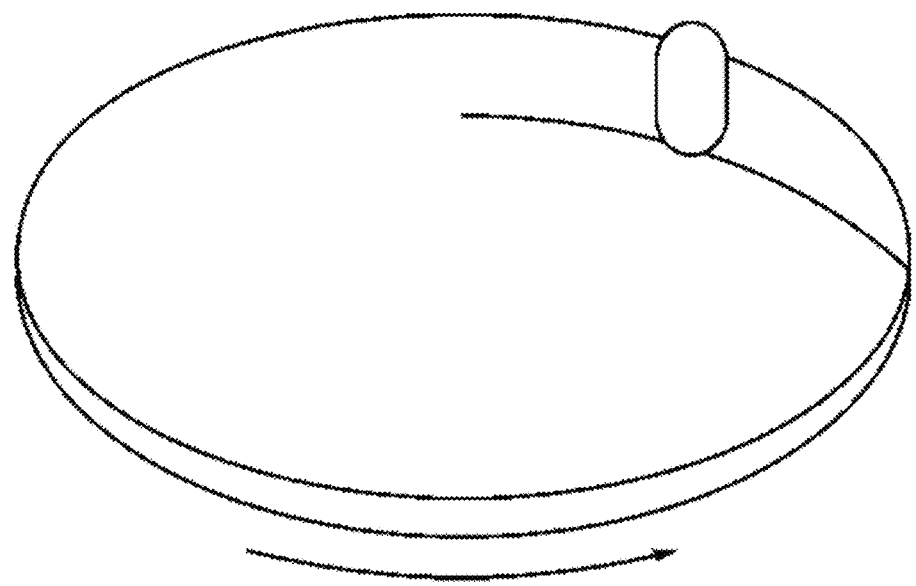
FIG. 11 is an oblique view illustrating a principle of arc envelope grinding of a rotary aspheric surface.

For comparison, the reference: Zhou Xuguang, Yan Qiusheng, Kong Lingye, Zhu Guangli. Effect of Wheel Geometry Parameters in Grinding Aspheric with AEGM [J]. Tool Engineering. Issue 8, 2015 proposed a precision grinding method for machining a concave-convex axisymmetric rotary curved surface by using an arc envelope grinding method. In a process of arc envelope grinding of an aspheric surface, the shape accuracy of the arc-shaped cross-section of a disc-shaped grinding wheel is duplicated on a curved surface of a part, and thus keeping a high-precision arc-shaped cross section of the disc-shaped grinding wheel is important to high-precision aspheric arc envelope grinding. The principle of arc envelope grinding is shown in FIG. 10 and FIG. 11. In the process of arc envelope grinding of an axisymmetric rotary aspheric surface, the aspheric surface rotates around its symmetry axis, and an arc part of the disc-shaped grinding wheel moves along a meridian cross-sectional curve AB of the axisymmetric rotary aspheric surface. In grinding, the arc part of the grinding wheel is always tangent to the aspheric surface, and a grinding point of the grinding wheel moves continuously along the arc cross section of the grinding wheel. If the solution of this reference is used to machine the aspheric surface with the diameter of 1000 in this embodiment, the C-axis of the machine tool rotates by at least 2500 turns, but when dx=12.3 mm is achieved by machining in this solution, the C-axis of the machine tool can complete the machining by only 41 turns. When the disc-shaped grinding wheel tool is used to machine a meter-scale large-diameter aspheric surface, the tool wear and machine tool shaft positioning errors are main factors that affect the accuracy of aspheric surface machining. In the solution of the present invention, the aspheric surface is enveloped by several spherical rings, and the widths of the rings are set reasonably, which not only ensures the machining efficiency, but also greatly reduces the length of the tool path. Dynamic balance characteristics of the tool are improved with the small-diameter annular tool.

Embodiment 3

A device for milling a large-diameter aspheric surface by using a splicing method is provided on the basis of Embodiment 1, where an equation of a generatrix equation f1 of the aspheric surface is: $z^2=2*R_0*x-(1+k)*x^2$, where $R_0$ is a curvature radius of a vertex of the aspheric surface, k is a quadratic conic coefficient, x is a horizontal coordinate independent variable, z is a vertical coordinate corresponding to the x coordinate, and a diameter is D; a numerical control machine tool for milling has positioning accuracy of β, where the numerical control machine tool has at least two translation motion axes: an X-axis and a Z-axis, and two rotation axes: a B-axis and a C-axis, where the B-axis is a rotation axis around a Y-axis, the C-axis is a rotation axis around the Z-axis, and a rotation axis of a turntable of the numerical control machine tool is located at the C-axis; a spindle of the numerical control machine tool is located at the Z-axis; the annular tool is installed on the spindle of the numerical control machine tool; the annular tool has an outer diameter of TD; a convex round chamfer between the outer diameter and an inner diameter of the annular tool has a radius of $r_0$; and TD<D/4.

The aspheric surface is discretized into N rings equally spaced in an X-axis direction, any ring has a width of dx=D/(2N), and a corresponding aspheric semi-diameter of the $n^{th}$ ring is denoted as: $x_n$: $x_n=n*dx$; and the $n^{th}$ ring has a curvature radius of $R_n=\text{sqrt}(R_0^2-k*x_n^2)$; where n is the ordinal number of any one of the first ring to the $N^{th}$ ring.

The annular tool on the numerical control machine tool is used to sequentially machine the $N_0^{th}$ ring to the $N^{th}$ ring, where when the $n^{th}$ ring is machined, the C-axis rotates continuously and uniformly, and an X-axis coordinate and a Z-axis coordinate of the tool center in a workpiece coordinate system are deduced as follows respectively:

$$x_n=n*dx;$$

$$BB=a\sin((TD-2*r_0)/(2*(R_n-r_0)));$$

a B-axis coordinate is: $B=a\sin(x_n/R_n)+BB$;

the X-axis coordinate of the tool center in the workpiece coordinate system is:

$$X_T=x_n+(((TD-2*r_0)+2*r_0*\sin(BB))/2)*\cos(B); \text{ and}$$

the Z-axis coordinate is:
when k≠−1:

$$Z_T=(((TD-2*r_0)+2*r_0*\sin(BB))/2)*\sin(B)+(R_0-\text{sqrt}(R_0^2-(1+k)*x_n^2))/(1+k), \text{ or}$$

when k=−1:

$$Z_T=(((TD-2*r_0)+2*r_0*\sin(BB))/2)*\sin(B)+x_n^2/(2*R_0);$$

where * is the multiplication operator, sqrt is the square root calculation operator, and sin, cos and a sin are the sine, cosine and arc sine operators respectively.

Embodiment 4

A method for numerical control milling and forming of an off-axis aspheric lens is provided, where an equation of a generatrix equation f1 of the aspheric surface is: $z^2=2*R_0*x-(1+k)*x^2$, where $R_0$ is a curvature radius of a vertex of the aspheric surface, k is a quadratic conic coefficient, an off-axis amount is y, x is a horizontal coordinate independent variable, and z is a vertical coordinate corresponding to the x coordinate; an aspheric parent lens including the off-axis aspheric surface has a diameter of D, a numerical control machine tool for milling has positioning accuracy of β, and steps for machining the off-axis aspheric lens are as follows.

(1) Prepare a lens body enveloping the off-axis aspheric lens based on contour geometric parameters of the off-axis aspheric lens, where upper and lower end faces of the lens body are parallel to each other.

Figure 12:
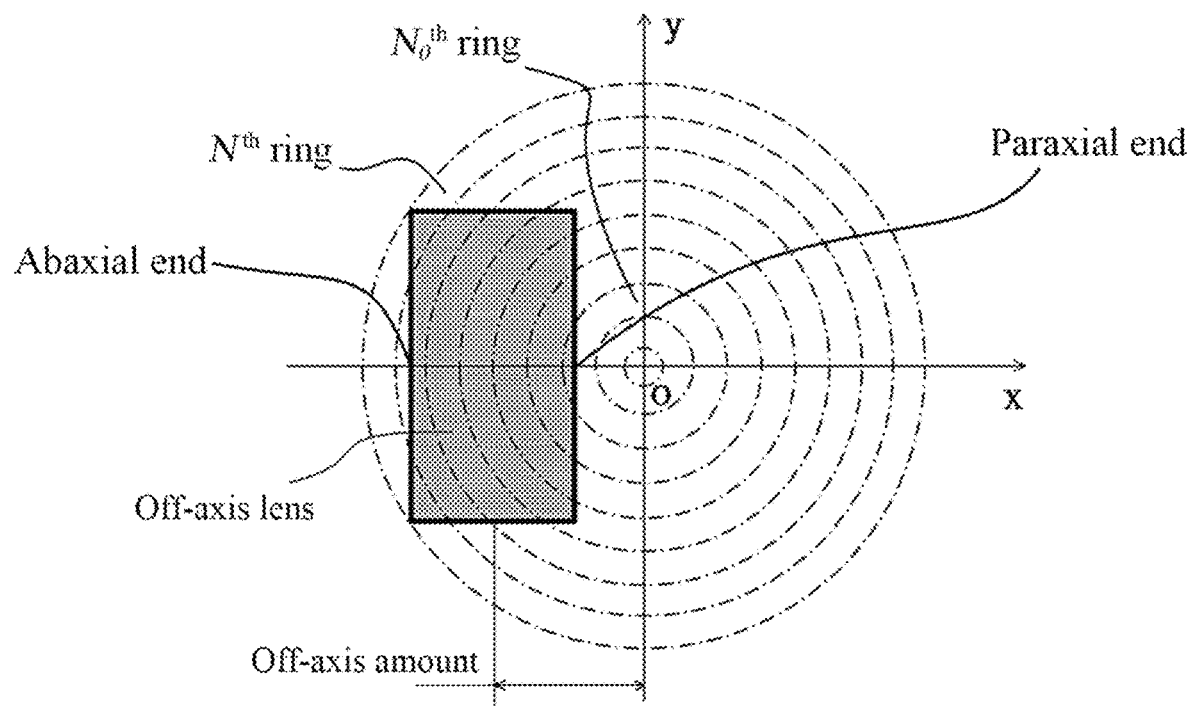
FIG. 12 is a schematic diagram illustrating a relationship between a rectangular off-axis aspheric lens and its parent lens.

(2) Fix the lens body in step (1) on a turntable of the numerical control machine tool, where the numerical control machine tool has at least two translation motion axes: an X-axis and a Z-axis, and two rotation axes: a B-axis and a C-axis, where the B-axis is a rotation axis around a Y-axis, the C-axis is a rotation axis around the Z-axis, and a rotation axis of the turntable of the numerical control machine tool is located at the C-axis; a spindle of the numerical control machine tool is located at the Z-axis; as shown in FIG. 12, a projection of a line connecting a paraxial end and an abaxial end of the lens body on the turntable of the numerical control machine tool coincides with the X-axis; and a distance between the center of the lens body and the rotation axis of the turntable of the numerical control machine tool is equal to the off-axis amount y.

(3) Install an annular tool on the spindle of the numerical control machine tool, where the annular tool has an outer diameter of TD; a convex round chamfer between the outer diameter and an inner diameter of the annular tool has a radius of $r_0$; and TD<D/4; establish an origin of a workpiece coordinate system at a vertex of the original spherical surface; where the annular tool is a hollow grinding wheel tool, including: an electroplated diamond grinding wheel, a bronze adhesive grinding wheel and a resin grinding wheel; regard the lens body as a part of the aspheric parent lens, and use generating cutting to directly machine the lens body into a spherical surface with a curvature radius of $R_0$.

Figure 13:
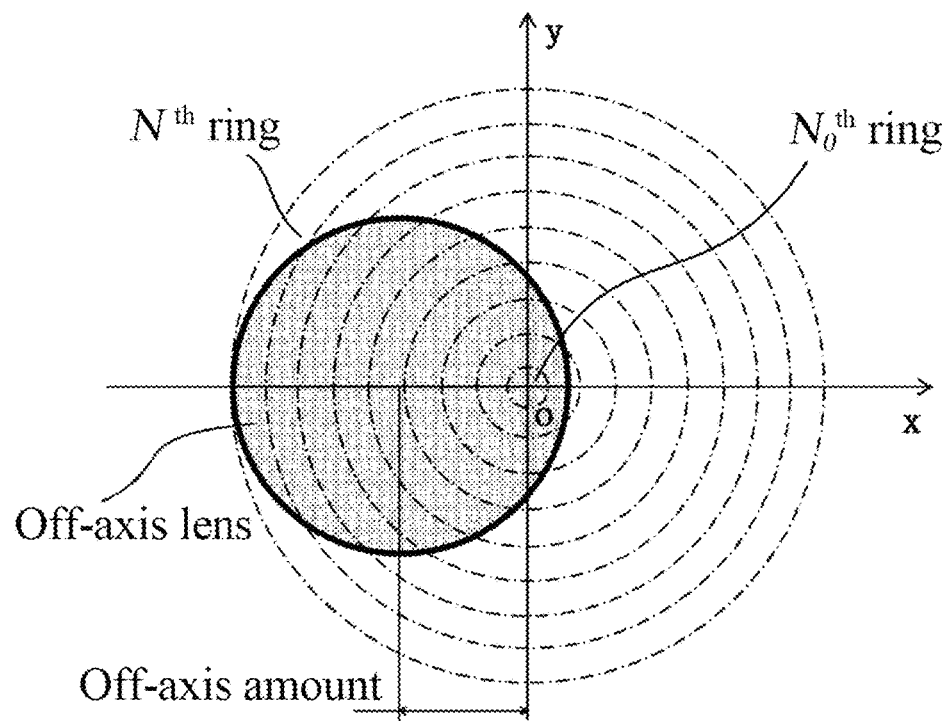
FIG. 13 is a schematic diagram illustrating a relationship between a circular off-axis aspheric lens and its parent lens.

(4) Discretize the aspheric parent lens into N rings equally spaced in an X-axis direction, where N is an integer, any ring has a width of dx=D/(2N), and a corresponding aspheric semi-diameter of the $n^{th}$ ring is denoted as: $x_n$: $x_n$=n*dx; and the $n^{th}$ ring has a curvature radius of $R_n$=sqrt($R_0^2$-k*$x_n^2$); where n is the ordinal number of any one of the first ring to the $N^{th}$ ring.

dx is jointly determined by the $N^{th}$ ring, the $(N-1)^{th}$ ring, the positioning accuracy β, and the generatrix equation f1 of the aspheric lens:

The width dx of any ring is solved based on the $N^{th}$ ring, the $(N-1)^{th}$ ring, the positioning accuracy, and the generatrix equation of the aspheric lens. Based on the diameter of the off-axis aspheric lens, a ring ordinal number range $N_0$-N of the off-axis aspheric lens is obtained. FIG. 12 is a schematic diagram illustrating a relationship between a rectangular off-axis aspheric lens and its parent lens; and FIG. 13 is a schematic diagram illustrating a relationship between a circular off-axis aspheric lens and its parent lens. It can be learned from the figures that the ring ordinal number range can be obtained based on a positional relationship between the off-axis lens and the parent lens.

(5) Use the annular tool on the numerical control machine tool to sequentially machine the $N_0^{th}$ ring to the $N^{th}$ ring, where when the $n^{th}$ ring is machined, the C-axis rotates continuously and uniformly, and an X-axis coordinate and a Z-axis coordinate of the tool center in the workpiece coordinate system are deduced as follows respectively:

$$x_n=n*dx;$$

$$BB=a\ \sin((TD-2*r_0)/(2*(R_n-r_0)));$$

a B-axis coordinate is: B=a sin($x_n/R_n$)+BB;
the X-axis coordinate of the tool center in the workpiece coordinate system is:

$$X_T=x_n+(((TD-2*r_0)+2*r_0*\sin(BB))/2)*\cos(B);\ \text{and}$$

the Z-axis coordinate is:
when k≠−1:

$$Z_T=(((TD-2*r_0)+2*r_0*\sin(BB))/2)*\sin(B)+(R_0-\text{sqrt}(R_0^2-(1+k)*x_n^2))/(1+k),\ \text{or}$$

when k=−1:

$$Z_T=(((TD-2*r_0)+2*r_0*\sin(BB))/2)*\sin(B)+x_n^2/(2*R_0);$$

where * is the multiplication operator, sqrt is the square root calculation operator, and sin, cos and a sin are the sine, cosine and arc sine operators respectively.

Figure 14:
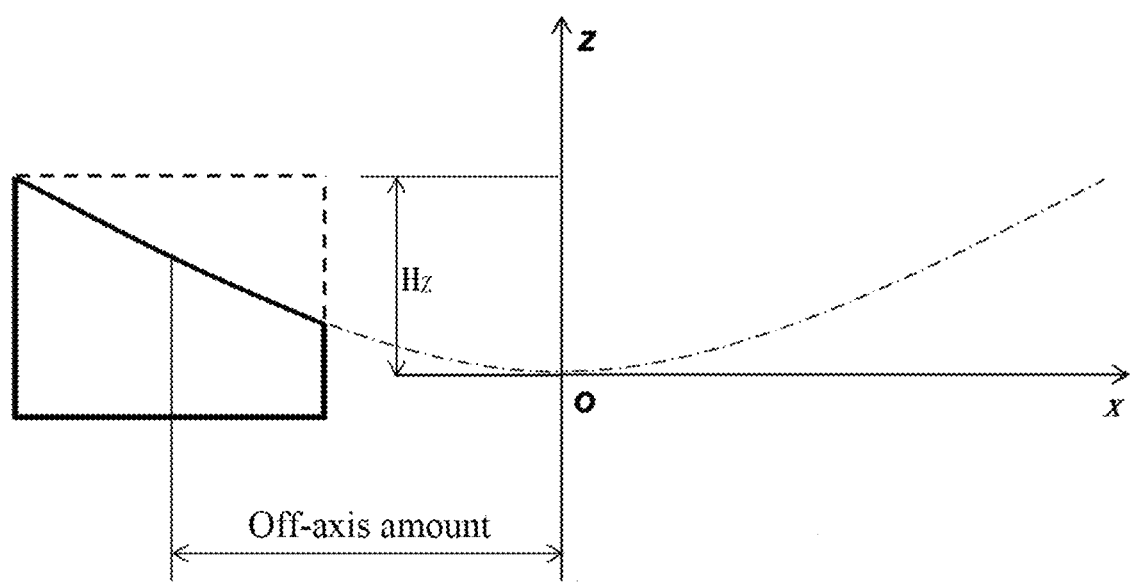
FIG. 14 is a schematic diagram illustrating an off-axis aspheric lens and its parent lens generatrix.

FIG. 14 is a schematic diagram illustrating a relationship between a two-dimensional curve between a paraxial end and an abaxial end of an off-axis aspheric lens and its parent lens generatrix. It can be learned from the figure that the off-axis aspheric lens is a part of the aspheric parent lens. When machined, the off-axis aspheric lens is placed on the turntable of the numerical control machine tool at a position that has a distance from the rotation axis equal to the off-axis amount, and then the off-axis aspheric lens can be machined by using the method for machining the aspheric parent lens; when $R_0$ is obtained by machining via generating cutting, a depth of downward machining by the annular grinding wheel tool from the upper end face of the lens body is a vector height Hz at an edge of the aspheric surface of the parent lens with a diameter of D.

The present invention relates to the field of optical machining. To solve the problems of large time consumption and serious tool wear in the machining of a meter-scale large-diameter aspheric surface, an aspheric surface is discretized into a series of rings with different radii, and the rings are sequentially machined via generating cutting by using an annular grinding wheel tool; the rings are equally spaced, there are a total of N rings, and a width of any ring is jointly determined by the $N^{th}$ ring, the $(N-1)^{th}$ ring, positioning accuracy, and a generatrix equation of the aspheric lens, and the $n^{th}$ ring has a curvature radius of $R_n$=sqrt($R_0^2$-k*(n*dx)$^2$); and the aspheric surface is enveloped by a large number of rings. The tool used for machining has a diameter less than ¼ of a semi-diameter of the aspheric surface, and a contact area between the tool and the workpiece surface is rings. Therefore, when machining large aspheric surfaces, the annular tool has a much longer service life than that of a tool in a conventional machining method; and a distance between the rings is much greater than a conventional machining screw pitch, so that the machining efficiency is significantly improved. The machining method of this solution may also be extended to off-axis aspheric machining and thus has strong practicability.

Letter symbols used in this solution are only simplified expressions to express the numerical relationship between their physical quantities, and should not be construed as a special limitation to the solution.

What is claimed is:
1. A method for milling a large-diameter aspheric surface by using a splicing method, the aspheric surface being a concave surface, with a generatrix equation denoted as f1, the aspheric surface having a diameter of D, and a numerical control machine tool for milling having positioning accuracy of β, wherein the aspheric surface is discretized into N rings equally spaced in an X-axis direction, N is an integer, any ring has a width of dx=D/(2N), and a semi-diameter of the aspheric surface corresponding to the $n^{th}$ ring is denoted as $x_n$; the rings are sequentially machined via generating cutting by using an annular grinding wheel tool with an outer diameter less than ¼ of the diameter of the aspheric surface; wherein n is the ordinal number of any one of the first ring to the $N^{th}$ ring, and constraint conditions of the dx solution are as follows: the generatrix equation of the $(N-1)^{th}$ ring is denoted as f2, and the generatrix equation of the $N^{th}$ ring is denoted as f3; a point at x1 on f3 is denoted as (x1, z1), a point with a vector height being z1 on f2 is denoted as (x2, z1), and a point at x2 on f1 is denoted as (x2, z2), wherein $x_n$=n*dx, x1=D/2, z1−z2=β, and x2=x1−dx.

2. The method for milling a large-diameter aspheric surface by using a splicing method according to claim 1, wherein an equation of the generatrix equation f1 of the aspheric surface is: $z^2=2*R_0*x-(1+k)*x^2$, wherein $R_0$ is a curvature radius of a vertex of the aspheric surface, the $n^{th}$ ring has a curvature radius of $R_n=\text{sqrt}(R_0^2-k*x_n^2)$, k is a quadratic conic coefficient, x is a horizontal coordinate independent variable, and z is a vertical coordinate corresponding to the x coordinate; steps for machining the aspheric surface are as follows:

(1) machining an aspheric lens body based on the curvature radius of $R_0$ of the vertex and the diameter of D of the aspheric surface, and machining an original spherical surface with a radius of $R_0$ and a diameter of D from the aspheric lens body material;

(2) fixing the aspheric lens body in step (1) on a turntable of the numerical control machine tool, and making an optical axis of the aspheric lens body coincide with a rotation axis of the turntable of the numerical control machine tool; wherein the numerical control machine tool has at least two translation motion axes: an X-axis and a Z-axis, and two rotation axes: a B-axis and a C-axis, wherein the B-axis is a rotation axis around a Y-axis, the C-axis is a rotation axis around the Z-axis, and a rotation axis of the turntable of the numerical control machine tool is located at the C-axis; and a spindle of the numerical control machine tool is located at the Z-axis;

(3) installing an annular tool on the spindle of the numerical control machine tool, wherein the annular tool has an outer diameter of TD, and a convex round chamfer between the outer diameter and an inner diameter of the annular tool has a radius of $r_0$; and TD<D/4; and establishing an origin of a workpiece coordinate system at a vertex of the original spherical surface;

(4) solving the width dx of any ring based on the $N^{th}$ ring, the $(N-1)^{th}$ ring, the positioning accuracy, and the generatrix equation of the aspheric surface; and (5) using the annular tool on the numerical control machine tool to sequentially machine the first ring to the $N^{th}$ ring, wherein when the $n^{th}$ ring is machined, the C-axis rotates continuously and uniformly, $x_n=n*dx;$ $BB=a\ \sin((TD-2*r_0)/(2*(R_n-r_0)));$ a B-axis coordinate is: $B=a\ \sin(x_n/R_n)+BB$;
an X-axis coordinate of the tool center in the workpiece coordinate system is:

$X_T=x_n+(((TD-2*r_0)+2*r_0*\sin(BB))/2)*\cos(B);$ and a Z-axis coordinate is:
when k≠−1:

$Z_T=(((TD-2*r_0)+2*r_0*\sin(BB))/2)*\sin(B)+(R_0-\text{sqrt}(R_0^2-(1+k)*x_n^2))/(1+k),$ or when k=−1:

$Z_T=(((TD-2*r_0)+2*r_0*\sin(BB))/2)*\sin(B)+x_n^2/(2*R_0);$ wherein * is the multiplication operator, sqrt is the square root calculation operator, and sin, cos and a sin are the sine, cosine and arc sine operators respectively.

3. The method for milling a large-diameter aspheric surface by using a splicing method according to claim 1, wherein the annular tool is a hollow grinding wheel tool, comprising: an electroplated diamond grinding wheel, a bronze adhesive grinding wheel and a resin grinding wheel.

4. A device for milling a large-diameter aspheric surface by using a splicing method, wherein an equation of a generatrix equation f1 of the aspheric surface is: $z^2=2*R_0*x-(1+k)*x^2$, wherein $R_0$ is a curvature radius of a vertex of the aspheric surface, k is a quadratic conic coefficient, x is a horizontal coordinate independent variable, z is the vertical coordinate corresponding to the x coordinate, and a diameter is D; a numerical control machine tool for milling has positioning accuracy of β, wherein the numerical control machine tool has at least two translation motion axes: an X-axis and a Z-axis, and two rotation axes: a B-axis and a C-axis, wherein the B-axis is a rotation axis around a Y-axis, the C-axis is a rotation axis around the Z-axis, and a rotation axis of a turntable of the numerical control machine tool is located at the C-axis; a spindle of the numerical control machine tool is located at the Z-axis; an annular tool is installed on the spindle of the numerical control machine tool; the annular tool has an outer diameter of TD; a convex round chamfer between the outer diameter and an inner diameter of the annular tool has a radius of $r_0$; and TD<D/4;

the aspheric surface is discretized into N rings equally spaced in an X-axis direction, N is an integer, any ring has a width of dx=D/(2N), a corresponding aspheric semi-diameter of the $n^{th}$ ring is: $x_n$: $x_n$=n*dx; and the $n^{th}$ ring has a curvature radius of $R_n=\text{sqrt}(R_0^2-k*x_n^2)$; wherein n is the ordinal number of any one of the first ring to the $N^{th}$ ring;

the annular tool on the numerical control machine tool is used to sequentially machine the $N_0^{th}$ ring to the $N^{th}$ ring, wherein when the $n^{th}$ ring is machined, the C-axis rotates continuously and uniformly, and an X-axis coordinate and a Z-axis coordinate of the tool center in a workpiece coordinate system are as follows:

$x_n=n*dx;$ $BB=a\ \sin((TD-2*r_0)/(2*(R_n-r_0)));$ a B-axis coordinate is: $B=a\ \sin(x_n/R_n)+BB$;
the X-axis coordinate of the tool center in the workpiece coordinate system is:

$X_T=x_n+(((TD-2*r_0)+2*r_0*\sin(BB))/2)*\cos(B);$ and the Z-axis coordinate is:
when k≠−1:

$Z_T=(((TD-2*r_0)+2*r_0*\sin(BB))/2)*\sin(B)+(R_0-\text{sqrt}(R_0^2-(1+k)*x_n^2))/(1+k),$ or when k=−1:

$Z_T=(((TD-2*r_0)+2*r_0*\sin(BB))/2)*\sin(B)+x_n^2/(2*R_0);$ wherein * is the multiplication operator, sqrt is the square root calculation operator, and sin, cos and a sin are the sine, cosine and arc sine operators respectively.

5. A method for polishing a large-diameter aspheric surface by using a splicing method, wherein an equation of a generatrix equation f1 of the aspheric surface is: $z^2=2*R_0*x-(1+k)*x^2$, wherein $R_0$ is a curvature radius of a vertex of the aspheric surface, k is a quadratic conic coefficient, x is a horizontal coordinate independent variable, z is a vertical coordinate corresponding to the x coordinate, and a diameter is D; a numerical control machine tool for milling has positioning accuracy of f1, wherein the numerical control machine tool has at least two translation motion axes: an X-axis and a Z-axis, and two rotation axes: a B-axis and a C-axis, wherein the B-axis is a rotation axis around a Y-axis, the C-axis is a rotation axis around the Z-axis, and a rotation axis of a turntable of the numerical control machine tool is located at the C-axis; a spindle of the numerical control machine tool is located at the Z-axis; an annular polishing disk is installed on the spindle of the numerical control machine tool; the annular polishing disk has an outer diameter of $T_D$; a convex round chamfer between the outer diameter and an inner diameter of the annular polishing disk has a radius of $r_0$; and $T_D < D/4$;

the aspheric surface is discretized into N rings equally spaced in an X-axis direction, N is an integer, any ring has a width of dx=D/(2N), a corresponding aspheric semi-diameter of the $n^{th}$ ring is: $x_n$: $x_n=n*dx$; and the $n^{th}$ ring has a curvature radius of $R_n=\mathrm{sqrt}(R_0^2-k*x_n^2)$; wherein n is the ordinal number of any one of the first ring to the $N^{th}$ ring;

the annular polishing disk on the numerical control machine tool is used to sequentially machine the first ring to the $N^{th}$ ring, wherein when the $n^{th}$ ring is machined, the C-axis rotates continuously and uniformly, and a polishing powder solution is sprayed between the annular polishing disk and the large-diameter aspheric lens during the machining process; the polishing powder solution is selected based on a hardness of a material to be polished, and polishing powder comprises aluminum oxide, cerium oxide, diamond micro powder and white corundum micro powder;

an X-axis coordinate and a Z-axis coordinate of the tool center in a workpiece coordinate system are respectively:

$x_n=n*dx$;

$BB=a\ \sin((TD-2*r_0)/(2*(R_n-r_0)))$;

a B-axis coordinate is: $B=a\ \sin(x_n/R_n)+BB$;

the X-axis coordinate of the tool center in the workpiece coordinate system is:

$X_T=x_n+(((TD-2*r_0)+2*r_0*\sin(BB))/2)*\cos(B)$; and the Z-axis coordinate is:

when $k \ne -1$:

$Z_T=(((TD-2*r_0)+2*r_0*\sin(BB))/2)*\sin(B)+(R_0-\mathrm{sqrt}(R_0^2-(1+k)*x_n^2))/(1+k)$, or when $k=-1$:

$Z_T=(((TD-2*r_0)+2*r_0*\sin(BB))/2)*\sin(B)+x_n^2/(2*R_0)$;

wherein * is the multiplication operator, sqrt is the square root calculation operator, and sin, cos and a sin are the sine, cosine and arc sine operators respectively.

* * * * *